US005817423A

United States Patent [19]

Kajimaru et al.

[11] Patent Number: 5,817,423

[45] Date of Patent: Oct. 6, 1998

[54] PTC ELEMENT AND PROCESS FOR PRODUCING THE SAME

[75] Inventors: Hiroshi Kajimaru; Keiichi Asami; Yoshiaki Iwaya; Yoshiaki Echigo; Akira Ito, all of Kyoto, Japan

[73] Assignee: Unitika Ltd., Hyogo, Japan

[21] Appl. No.: 607,636

[22] Filed: Feb. 27, 1996

[30] Foreign Application Priority Data

Feb. 28, 1995 [JP] Japan .................................... 7-039708

[51] Int. Cl.[6] ............................. B32B 15/08; H01C 7/00; B29C 65/00; B30B 11/00

[52] U.S. Cl. .......................... 428/461; 428/500; 428/457; 338/13; 427/374.2; 264/241; 264/340; 264/345; 100/92

[58] Field of Search ..................................... 428/457, 461, 428/462, 220, 500, 283, 402; 338/22 R, 13, 25; 427/374.2, 58, 101; 264/241, 340, 345; 100/92

[56] References Cited

U.S. PATENT DOCUMENTS

| | | | |
|---|---|---|---|
| 4,237,441 | 12/1980 | van Konynenburg et al. | 338/22 R |
| 4,329,726 | 5/1982 | Middleman et al. | 361/58 |
| 4,388,607 | 6/1983 | Toy et al. | 338/225 D |
| 4,545,926 | 10/1985 | Fouts, Jr. et al. | 252/511 |
| 4,668,857 | 5/1987 | Smuckler | 219/549 |
| 4,724,417 | 2/1988 | Au et al. | 338/22 R |
| 4,775,778 | 10/1988 | van Konynenburg et al. | 219/549 |
| 4,818,439 | 4/1989 | Blackledge et al. | 252/511 |
| 5,113,058 | 5/1992 | Srubas et al. | 219/548 |
| 5,214,738 | 5/1993 | Nakajima et al. | 338/22 R |
| 5,241,741 | 9/1993 | Sugaya | 29/612 |
| 5,250,226 | 10/1993 | Oswal et al. | 252/500 |
| 5,280,263 | 1/1994 | Sugaya | 338/22 R |

FOREIGN PATENT DOCUMENTS 0 231 068 1/1987 European Pat. Off. .

*Primary Examiner*—John J. Zimmerman
*Assistant Examiner*—Michael LaVilla
*Attorney, Agent, or Firm*—Sughrue, Mion, Zinn, Macpeak & Seas, PLLC

[57] ABSTRACT

A PTC element comprising a conductive sheet of a crystalline polyolefin matrix and a conductive filler, having provided on both sides thereof an electrode of a metallic foil, the PTC element having a resistivity at 20° C. ($\rho_{20}$) of not more than 1.8 Ω·cm, a peak resistivity ($\rho_p$) of not less than $2.0\times10^6$ Ω·cm, and a temperature difference [$T_a$(0°C.)–$T_b$ (°C.)] of not greater than 10° C., wherein $T_a$(°C.) is a temperature at which the resistivity is $10^6$ times the resistivity at 20° C. ($\rho_{20}$) and $T_b$ (°C.) is a temperature at which the resistivity is 10 times the resistivity at 20° C. ($\rho_{20}$). The PTC element is produced by a process comprising mixing a crystalline polyolefin and a conductive filler, molding the mixture into a conductive sheet, press bonding under heat a metallic foil to both sides of the conductive sheet, and repeatedly subjecting the conductive sheet to a heating and cooling cycle consisting of heating at a temperature of not lower than (the melting point of the crystalline polyolefin minus 5° C.) and then cooling to a temperature lower than (the melting point of the crystalline polyolefin minus 5° C.). The PTC elements exhibit an extremely low resistivity at 20° C. and a high resistivity at a peak temperature, showing a very steep increase in resistance in a narrow temperature range.

7 Claims, No Drawings

PTC ELEMENT AND PROCESS FOR PRODUCING THE SAME

FIELD OF THE INVENTION

This invention relates to elements exhibiting a positive temperature coefficient (PTC) behavior (hereinafter referred to as PTC elements) and to a process for producing the same.

BACKGROUND OF THE INVENTION

PTC elements comprising barium titanate are most commonly known. In recent years PTC elements composed of a conductive sheet comprising a polymer material having uniformly dispersed therein conductive particles have been developed for their possibility of reduction in size and resistance. For example, PTC elements composed of an electrode and a conductive sheet comprising a crystalline polymer (e.g., polyolefins) and conductive particles (e.g., carbon black and conductive nickel particles) are disclosed in U.S. Pat. No. 4,724,417, EP-A-231,068, and U.S. Pat. No. 4,237,441 and U.S. Pat. No. 4,545,926, herein incorporated by reference.

All the PTC elements disclosed in these references exhibit a low resistivity at room temperature and a high resistivity at a peak temperature. However, the resistivity of these PTC elements changes from low to high over a broad range of temperatures. Accordingly, when these PTC elements are used as a protective element against overcurrents, the elements change into a high resistant state at relatively low currents. Therefore, it is difficult to use these elements in high current circuits which has limited the range of application of PTC elements.

SUMMARY OF THE INVENTION

An object of the present invention is to provide a PTC element which exhibits an extremely low resistivity at 20° C. and a high peak resistivity, undergoing a steep rise in resistivity within a narrow temperature range.

Another object of the present invention is to provide a process for producing such a PTC element.

As a result of extensive studies, the inventors of the present invention found that the difference between a temperature $T_a$(°C.) at which the resistivity reaches $10^6$ times the resistivity at 20° C. ($\rho_{20}$) and a temperature $T_b$(°C.) at which the resistivity reaches 10 times the resistivity at 20° C. ($\rho_{20}$), i.e., [$T_a$(°C.)–$T_b$(°C.)], is a very important factor for a PTC element to allow passage of high currents. Moreover, the present inventors found that the above objects of the present invention can be accomplished by a PTC element having a temperature difference of not greater than 10° C. The present invention has been completed based on this finding.

The present invention relates to a PTC element comprising a conductive sheet comprising a crystalline polyolefin matrix and a conductive filler, and provided on both sides thereof an electrode comprising a metallic foil, the PTC element having a resistivity at 20° C. ($\rho_{20}$) of not more than 1.8 Ω·cm, a peak resistivity ($\rho_p$) of not less than $2.0\times10^6$ Ω·cm, and a temperature difference [$T_a$(°C.)–$T_b$(° C.)] of not greater than 10° C., wherein $T_a$(°C.) is a temperature at which the resistivity is $10^6$ times the resistivity at 20° C. ($\rho_{20}$) and $T_b$(°C.) is a temperature at which the resistivity is 10 times the resistivity at 20° C. ($\rho_{20}$).

The PTC element of the present invention can be produced by a process comprising the steps of mixing a crystalline polyolefin and a conductive filler, molding the mixture into a conductive sheet, press-bonding under heat a metallic foil onto both sides of the conductive sheet, and repeatedly subjecting the conductive sheet to a heating and cooling cycle comprising the steps of heating to a temperature of not lower than (the melting point of the crystalline polyolefin minus 5° C.) and then cooling to a temperature lower than (the melting point of the crystalline polyolefin minus 5° C.).

DETAILED DESCRIPTION OF THE INVENTION

The resistivity of the PTC element of the present invention at 20° C. ($\rho_{20}$) is not more than 1.8 Ω·cm, preferably not more than 1.7 Ω·cm, and still more preferably not more than 1.5 Ω·cm. While $\rho_{20}$ is desirably as low as possible, a practical lowest possible value is 0.1 Ω·cm. If $\rho_{20}$ is greater than 1.8 Ω·cm, it is difficult to prepare a small-sized and low-resistant PTC element.

The peak resistivity ($\rho_p$) of the PTC element of the present invention is not less than $2.0\times10^6$ Ω·cm, preferably not less than $5.0\times10^6$ Ω·cm, and still more preferably not less than $1.0\times10^7$ Ω·cm. While $\rho_p$ is desirably as high as possible, a practical highest possible value is $1\times10^{10}$ Ω·cm. If $\rho_p$ is less than $2.0\times10^6$ Ω·cm, it is difficult to apply the PTC element to electric circuits to which a high voltage is applied.

The temperature difference [$T_a$(°C.)–$T_b$(°C.)] between a temperature $T_a$(°C.) at which the resistivity is $10^6$ times the resistivity at 20° C. ($\rho_{20}$) and a temperature $T_b$(°C.) at which the resistivity is 10 times the resistivity at 20° C. ($\rho_{20}$) is not greater than 10° C. The temperature difference is preferably not greater than 8° C., and still more preferably not greater than 6° C. While the temperature difference is preferably as small as possible, a practical smallest possible difference is 1° C. If the temperature difference [$T_a$(°C.)–$T_b$(°C.)] is greater than 10° C., it is difficult to apply the PTC element to electric circuits through which a high current passes.

The resistivity of the PTC element of the present invention is calculated from the resistance of the PTC element according to equation (1):

$$\rho=R\cdot A/t \quad (1)$$

wherein ρ is a resistivity (Ω·cm) of the PTC element; R is a resistance (Ω) of the PTC element; A is the area ($cm^2$) of the electrode of the PTC element; and t is an average length (cm) between the electrodes through which a current passes (the thickness of the PTC element inclusive of the electrodes).

Accordingly, the resistivity at 20° C. ($\rho_{20}$) is obtained from the resistance at 20° C. using equation (1). The resistance of the PTC element is measured as the element is externally heated from 20° C. at a rate of 1° C./min, and substituted for R in equation (1) to obtain a resistivity vs. temperature. The values of $\rho_p$, $T_a$, and $T_b$ are easily obtained from these results.

The PTC element according to the present invention comprises a conductive sheet comprising a crystalline polyolefin matrix and a conductive filler, and a metallic foil provided on each side of the conductive sheet. The crystalline polyolefin used has a crystallinity of at least 10%, preferably 30% or more, more preferably 50% or more, as measured by differential scanning calorimetry (DSC). Examples of crystalline polyolefins include low-density polyethylene, middle-density polyethylene, high-density polyethylene, polypropylene, and ethylene-propylene copolymer. These crystalline polyolefins are used either individually or as a combination thereof. Polyethylene is preferred. High-density polyethylene is more preferred.

The polyethylene used in the present invention preferably has a melt flow rate of 0.01 to 15, preferably 0.1 to 12, more preferably 1 to 8. If the melt flow rate exceeds 15, [$T_a$(°C.) −$T_b$(°C.)] becomes greater than 10° C., making it difficult for the PTC element to be useful in circuits through which a high current passes. If the melt flow rate is less than 0.01, moldability into a sheet is reduced.

The term melt flow rate as used herein is intended to mean the weight (g) of a polyolefin which is extruded out in a given time under specific test conditions and specifically denotes a value measured according to the test method specified in JIS K7210. In the present invention, the melt flow rate of polyethylene was measured at a temperature of 190° C. under a load of 2.16 kgf (21.18N), and that of polypropylene was measured at 230° C. under a load of 2.16 kgf (21.18N), according to JIS K7210.

The crystalline polyolefin which can be used for preparing the conductive sheet is not particularly limited in shape and may be comprised of particles, pellets, etc.

The conductive filler which composes the conductive sheet with the crystalline polyolefin includes metallic fillers such as Ni and Cu and carbonaceous conductive fillers such as graphite, carbon black (e.g., acetylene black) and glassy carbon prepared by carbonization of thermosetting resins (e.g., furfuryl alcohol resins and phenolic resins) in an inert atmosphere (including vacuum atmosphere). Among these conductive fillers, those comprising glassy carbon are preferred and particulate glassy carbons obtained by calcining spherical phenolic resins in an inert atmosphere at the temperature of 1000° C. or higher are particularly preferable. Spherical phenolic resins may be prepared in accordance with the method disclosed in U.S. Pat. No. 4,748,214 and are also available as commercial products. The particulate glassy carbon used in the present invention preferably has an average particle size of 1 to 50 μm, still more preferably 5 to 20 μm. Those having an average particle size of less than 1 μm tend to have a reduced peak resistivity $\rho_p$, and those greater than 50 μm tend to cause sparking among the particles.

In the present invention, the term "an average particle size" is an average particle size determined by observing more than one hundred glassy carbon particles under a microscope of 200 magnification, and calculating an average particle size of one hundred particles.

The metallic foil, which is used as an electrode of the PTC element, includes an electrodeposited foil or a rolled foil of copper, aluminum, nickel, etc. Preferably a nickel foil is used since its increase in resistance due to oxidation during press bonding under heat is low. Metallic foils having been subjected to surface roughening treatment, so-called matted foils, can also be used. A gold or silver foil can be used but the cost will be increased.

A mixing ratio of the crystalline polyolefin and the conductive filler preferably ranges from 20:80 to 80:20 by weight, still more preferably from 30:70 to 70:30 by weight. If the proportion of the crystalline polyolefin is less than 20% by weight, the resulting conductive sheet tends to have reduced strength. If it exceeds 80% by weight, the conductive sheet tends to fail to provide sufficient conductivity.

As long as the effects of the present invention are not impaired (10% by weight or less), the conductive sheet may contain inorganic fillers, such as alumina, aluminum hydroxide, calcium carbonate, magnesium silicate, talc, and glass beads; antioxidants; and the like additives.

The PTC element of this invention can be produced by mixing prescribed amounts of the crystalline polyolefin and the conductive filler by, for example, dry blending or melt kneading, molding the mixture into a sheet, press bonding a metallic foil to each side of the resulting conductive sheet under heat, and repeatedly subjecting the conductive sheet to a heating and cooling cycle comprising the steps of heating to a temperature of not lower than the melting point of the crystalline polyolefin minus 5° C. and then cooling to a temperature lower than the melting point of the crystalline polyolefin minus 5° C.

By the term "melting point" as used herein is meant a temperature corresponding to the peak of the differential scanning calorimetry curve. Where a mixture of two or more crystalline polyolefins is used as a matrix, the lowest of the peak temperatures is taken as the melting point.

An example of the process for producing the PTC element is described below, in which polyethylene and particulate glassy carbon are mixed by melt kneading, the mixture is pressure molded under heat to obtain a conductive sheet, a metallic foil is press bonded under heat to the conductive sheet, and the conductive sheet is subjected to heat treatment. PTC elements using other crystalline polyolefins and other conductive fillers can be produced similarly.

Prescribed amounts of polyethylene and particulate glassy carbon are mixed in a melt kneading machine, such as a Plastomill, a kneader, a roll mill, a Banbury mixer or a twin screw extruder. The mixing temperature is preferably in the range of from the melting point of polyethylene to the melting point plus 150° C., still more preferably, the mixing temperature is in the range of from the melting point plus 10° C. to the melting point plus 100° C. If the mixing temperature is lower than the melting point, it tends to be difficult to uniformly mix the components. If the temperature is higher than the melting point plus 150° C., polyethylene tends to deteriorate. The mixing time is preferably from 1 to 600 minutes, still more preferably from 3 to 180 minutes. Mixing for less than 1 minute tends to fail to prepare a uniform mixture, and mixing for more than 600 minutes is economically disadvantageous.

The melt kneaded mixture is molded under heat and pressure. The heating temperature is preferably from the melting point of polyethylene to the melting point plus 100° C., still more preferably from the melting point plus 5° C. to the melting point plus 80° C. At temperatures lower than the melting point, the resulting sheet tends to have insufficient strength. At temperatures higher than the melting point plus 100° C., the polyethylene melted by heating covers the surface of the particulate glassy carbon, tending to prevent sufficient conductivity.

The molding pressure preferably ranges from 2 to 200 kg/cm$^2$, and still more preferably from 5 to 100 kg/cm$^2$. The molding time is preferably 10 to 3600 seconds, and still more preferably 20 to 800 seconds. If the pressure is lower than 2 kg/cm$^2$ or the molding time is less than 10 seconds, the resulting sheet tends to have insufficient strength. Molding under a pressure exceeding 200 kg/cm$^2$ or for a molding time exceeding 3600 seconds is economically disadvantageous.

The resulting conductive sheet was sandwiched in between a pair of metal foils, and hot pressed, preferably at a heating temperature of from the melting point of polyethylene to the melting point plus 100° C., and still more preferably from the melting point plus 5° C. to the melting point plus 80° C. If the temperature is lower than the melting point, the adhesion strength between the metallic foil and the conductive sheet tends to be insufficient. If it is higher than the melting point plus 100° C., the polyethylene melted by heating covers the surface of the glassy carbon, resulting in an increase in resistance of the PTC element. The pressure applied is preferably from 2 to 200 kg/cm$^2$, and still more preferably from 5 to 100 kg/cm$^2$. The press bonding time is preferably 10 to 3600 seconds, and still more preferably from 20 to 800 seconds. If the pressure is lower than 2 kg/cm$^2$, or if the press bonding time is shorter than 10 seconds, the adhesion strength between the metallic foil and the conductive sheet tends to be insufficient. A pressure exceeding 200 kg/cm$^2$ or a press bonding time exceeding 3600 seconds is economically disadvantageous.

After press bonding the metallic foils to the conductive sheet under heat, it is preferable to carry out a heat treatment in order to obtain improved adhesion and more stable PTC characteristics. The heat treating temperature is preferably from the melting point of polyethylene to the melting point plus 100° C., more preferably from the melting point to the melting point plus 60° C., most preferably from the melting point to the melting point plus 40° C. The heat treating time is preferably 0.1 to 20 hours, and still more preferably 0.2 to 10 hours. If the temperature and time conditions of the heat treatment are outside of the above ranges, the PTC characteristics tend to be unstable.

The sheet having been subjected to heat treatment is cut to a desired size and then, in order to reduce the resistance, repeatedly subjected to a heating and cooling cycle comprising the steps of heating to a temperature of not lower than the melting point of the polyolefin minus 5° C. and then cooling to a temperature lower than the melting point of the polyolefin minus 5° C.

The heating temperature is preferably from the melting point minus 2° C. to the melting point plus 50° C., and more preferably from the melting point to the melting point plus 20° C. The heating time is preferably from 1 second to 1 hour, more preferably 5 seconds to 30 minutes, most preferably 10 seconds to 10 minutes. If the heating time is outside of the above range, the resistance may not be sufficiently reduced.

The cooling temperature is preferably the melting point minus 20° C. or lower, and more preferably the melting point minus 40° C. or lower. The cooling time is not particularly limited.

The heating and cooling cycle is preferably repeated at least 3 times, more preferably 5 times or more, and most preferably 10 times or more. If the repeating time is less than 3 times, the resistance may not be sufficiently reduced.

The PTC element of the present invention can thus be produced.

The size or thickness of the PTC element is varied according to the circuit of the appliance in which it is used or to the applied voltage or current. In general, the PTC element is used with the area of electrode being from 0.05 cm$^2$ to 10 cm$^2$ and the thickness being from 0.1 mm to 5 mm. The PTC element may be used in various shapes, such as a disc shape, a rectangular shape, a doughnut shape, and the like.

The PTC element of the present invention is suitably useful as a protection for a semiconductor memory, CPU (central processing unit), etc. against passage of overcurrent in small-sized electronic appliances using batteries as a power source, such as notebook personal computers, portable personal telephones, small-sized printers, and the like.

The present invention will now be illustrated in greater detail with reference to Examples. Unless otherwise indicated, all parts, ratios, percents and the like are by weight.

EXAMPLE 1

In a Plastomill (Model R-60 manufactured by Toyo Seiki Seisakusho), were put 45% by weight of high-density polyethylene powder having a melt flow rate of 2.5 (melting point: 135° C.; produced by Dow Chemical Co.) and 55% by weight of particulate glassy carbon (GCP-30H produced by Unitika Ltd.) having an average particle size of 15 μm, which was obtained by calcining a spherical phenolic resin at 1900° C., and the mixture was melt kneaded at 150° C. for 10 minutes. The mixture was hot press molded at a molding temperature of 140° C. under a molding pressure of 10 kg/cm$^2$ for 5 minutes and cooled under pressure to obtain a conductive sheet having a thickness of 0.45 mm. The resulting conductive sheet was sandwiched in between a pair of nickel foils (ENi-T produced by Fukuda Metal Foil & Powder Co., Ltd.; thickness: 25 μm), and hot pressed at 140° C. and 10 kg/cm$^2$ for 3 minutes, followed by cooling under pressure. The conductive sheet with the nickel foils was further heat treated at 150° C. for 1 hour to obtain a conductive sheet having a metal foil press-bonded on both sides thereof and having a total thickness, inclusive of the metal foils, of 0.5 mm. A disc of 15 mm in diameter was cut out of the conductive sheet with metal foils and subjected to 20 heating/cooling cycles consisting of heating at 135° C. for 20 seconds and then maintaining at 20° C. for 5 minutes to prepare a PTC element.

The resistance at 20° C. ($R_{20}$) of the PTC element was found to be 0.039 Ω. Substitution of the resistance in equation (1) gave a $\rho_{20}$ of 1.38 Ω·cm. The resistance of the PTC element as measured while the element was externally heated from 20° C. at a rate of 1° C./min was substituted for R in equation (1) to obtain a resistivity vs. temperature. As a result, the peak temperature ($T\rho_p$) showing $\rho_p$ was 130° C.; $\rho_p$ was 2.4×10$^7$ Ω·cm; $T_a$ was 129° C.; and $T_b$ was 124° C.; thus the difference of [$T_a$(°C.)−$T_b$(°C.)] was 5° C. These physical properties are shown in Table 1 below.

EXAMPLE 2

In a bench scale kneader (Model PBV-01 manufactured by Irie Shokai K.K.), were put 40% by weight of high-density polyethylene powder having a melt flow rate of 6.0 (FLO-THENE-M produced by Sumitomo Seika Chemicals Co., Ltd.; melting point: 127° C.) and 60% by weight of particulate glassy carbon (GCP-30H produced by Unitika Ltd.) having an average particle size of 15 μm, which was obtained by calcining a spherical phenolic resin at 1900° C., and the mixture was melt kneaded at 180° C. for 20 minutes. The mixture was hot press molded at a molding temperature of 140° C. under a molding pressure of 10 kg/cm$^2$ for 5 minutes, followed by cooling under pressure to obtain a conductive sheet having a thickness of 0.45 mm. The resulting conductive sheet was sandwiched in between a pair of nickel foils (ENi-T produced by Fukuda Metal Foil & Powder Co., Ltd.; thickness: 25 μm), and hot pressed at 140° C. and 10 kg/cm$^2$ for 3 minutes, followed by cooling under pressure. The conductive sheet with the nickel foils was further heat treated at 150° C. for 1 hour to obtain a conductive sheet having a metal foil press-bonded on both sides thereof and having a total thickness, inclusive of the metal foils, of 0.49 mm. A disc of 15 mm in diameter was cut out of the conductive sheet with metal foils and subjected to 20 heating/cooling cycles consisting of heating at 127° C. for 20 seconds and then maintaining at 20° C. for 5 minutes to prepare a PTC element.

The resistance $R_{20}$ of the PTC element at 20° C. was found to be 0.046 Ω. Substitution of the resistance in equation (1) gave a $\rho_{20}$ of 1.66 Ω·cm. Various physical values were measured in the same manner as in Example 1, and the results obtained are shown in Table 1 below.

EXAMPLE 3

In a bench scale kneader (Model PBV-01 manufactured by Irie Shokai K.K.), were put 45% by weight of high-density polyethylene pellets having a melt flow rate of 2.4 (Showlex 5020 produced by Showa Denko, K.K.; melting point: 130° C.) and 55% by weight of particulate glassy carbon (GCP-30H produced by Unitika Ltd.) having an average particle size of 15 μm, which was obtained by calcining a spherical phenolic resin at 1900° C., and the mixture was melt kneaded at 180° C. for 40 minutes. The mixture was hot press molded at a molding temperature of 160° C. under a molding pressure of 10 kg/cm$^2$ for 5 minutes, followed by cooling under pressure to obtain a conductive sheet having a thickness of 0.46 mm. The resulting conductive sheet was sandwiched in between a pair of nickel foils (ENi-T produced by Fukuda Metal Foil & Powder Co., Ltd.; thickness: 25 μm), and hot pressed at 160° C. and 10 kg/cm$^2$ for 3 minutes, followed by cooling under pressure. The conductive sheet with the nickel foils was further heat treated at 150° C. for 1 hour to obtain a conductive sheet having a metal foil press-bonded on both sides thereof and having a total thickness, inclusive of the metal foils, of 0.49 mm. A disc of 15 mm in diameter was cut out of the conductive sheet with metal foils and subjected to 20 heating/cooling cycles consisting of heating at 130° C. for 20 seconds and then maintaining at 20° C. for 5 minutes to prepare a PTC element.

The resistance $R_{20}$ of the PTC element at 20° C. was found to be 0.043 Ω. Substitution of the resistance in equation (1) gave a $\rho_{20}$ of 1.55 Ω·cm. Various physical values were measured in the same manner as in Example 1, and the results obtained are shown in Table 1 below.

EXAMPLE 4

In a Plastomill (Model R-60 manufactured by Toyo Seiki Seisakusho), were put 42% by weight of low-density polyethylene powder having a melt flow rate of 1.5 (FLO-THENE-UF-1.5 produced by Sumitomo Seika Chemicals Co., Ltd.; melting point: 107° C.) and 58% by weight of particulate glassy carbon (GCP-30H produced by Unitika Ltd.) having an average particle size of 15 μm, which was obtained by calcining a spherical phenolic resin at 1900° C. The mixture was melt kneaded at 150° C. for 20 minutes. The mixture was hot press molded at a molding temperature of 120° C. under a molding pressure of 10 kg/cm$^2$ for 5 minutes and cooled under pressure to obtain a conductive sheet having a thickness of 0.45 mm. The resulting conductive sheet was sandwiched in between a pair of nickel foils (ENi-T produced by Fukuda Metal Foil & Powder Co., Ltd.; thickness: 25 μm), and hot pressed at 120° C. and 10 kg/cm$^2$ for 3 minutes, followed by cooling under pressure. The conductive sheet with the nickel foils was further heat treated at 120° C. for 1 hour to obtain a conductive sheet having a metal foil press-bonded on both sides thereof and having a total thickness, inclusive of the metal foils, of 0.48 mm. A disc of 15 mm in diameter was cut out of the conductive sheet with metal foils and subjected to 20 heating/cooling cycles consisting of heating at 107° C. for 20 seconds and then maintaining at 20° C. for 5 minutes to prepare a PTC element.

The resistance of the PTC element at 20° C. was found to be 0.042 Ω. Substitution of the resistance in equation (1) gave $\rho_{20}$ of 1.55 Ω·cm. Various physical values were measured in the same manner as in Example 1, and the results obtained are shown in Table 1 below.

EXAMPLE 5

In a bench scale kneader (Model PBV-01 manufactured by Irie Shokai K.K.), were put 45% by weight of polypropylene powder having a melt flow rate of 6.4 (PN 640 produced by Tokuyama K.K.; melting point: 161° C.) and 55% by weight of particulate glassy carbon (GCP-30H produced by Unitika Ltd.) having an average particle size of 15 μm, which was obtained by calcining a spherical phenolic resin at 1900° C., and the mixture was melt kneaded at 220° C. for 20 minutes. The mixture was hot press molded at a molding temperature of 180° C. under a molding pressure of 10 kg/cm$^2$ for 5 minutes, followed by cooling under pressure to obtain a conductive sheet having a thickness of 0.44 mm. The resulting conductive sheet was sandwiched in between a pair of nickel foils (ENi-T produced by Fukuda Metal Foil & Powder Co., Ltd.; thickness: 25 μm), and hot pressed at 180° C. and 10 kg/cm$^2$ for 3 minutes, followed by cooling under pressure. The conductive sheet with the nickel foils was further heat treated at 180° C. for 1 hour to obtain a conductive sheet having a metal foil press-bonded on both sides thereof and having a total thickness, inclusive of the metal foils, of 0.48 mm. A disc of 15 mm in diameter was cut out of the conductive sheet with metal foils and subjected to 20 heating/cooling cycles consisting of heating at 161° C. for 20 seconds and then maintaining at 20° C. for 5 minutes to prepare a PTC element.

The resistance of the PTC element at 20° C. was found to be 0.044 Ω. Substitution of the resistance in equation (1) gave a $\rho_{20}$ of 1.62 Ω·cm. Various physical values were measured in the same manner as in Example 1, and the results obtained are shown in Table 1 below.

COMPARATIVE EXAMPLE 1

In a bench scale kneader (Model PBV-01 manufactured by Irie Shokai K.K.), were put 42% by weight of high-density polyethylene powder having a melt flow rate of 23 (CHEMIREZ 1210 produced by Maruzen Polymer K.K.; melting point: 131° C.) and 58% by weight of particulate glassy carbon (GCP-30H produced by Unitika Ltd.) having an average particle size of 15 μm, which was obtained by calcining a spherical phenolic resin at 1900° C., and the mixture was melt kneaded at 150° C. for 20 minutes. The mixture was hot press molded at a molding temperature of 140° C. under a molding pressure of 10 kg/cm$^2$ for 5 minutes, followed by cooling under pressure to obtain a conductive sheet having a thickness of 0.45 mm. The resulting conductive sheet was sandwiched in between a pair of nickel foils (ENi-T produced by Fukuda Metal Foil & Powder Co., Ltd.; thickness: 25 μm), and hot pressed at 140° C. and 10 kg/cm$^2$ for 3 minutes, followed by cooling under pressure. The conductive sheet with the nickel foils was further heat treated at 150° C. for 1 hour to obtain a conductive sheet having a metal foil press-bonded on both sides thereof and having a total thickness, inclusive of the metal foils, of 0.49 mm. A disc of 15 mm in diameter was cut out of the conductive sheet with metal foils to obtain a PTC element.

The resistance of the resulting PTC element at 20° C. was found to be 0.48 Ω. Substitution of the resistance in equation (1) gave a $\rho_{20}$ of 17.3 Ω·cm. Various physical values were measured in the same manner as in Example 1, and the results obtained are shown in Table 1 below.

TABLE 1

| | $R_{20}$ (Ω) | $\rho_{20}$ (Ω · cm) | $\rho_P$ (Ω · cm) | $T_{\rho P}$ (°C.) | $T_a$ (°C.) | $T_b$ (°C.) | $T_a$–$T_b$ (°C.) |
|---|---|---|---|---|---|---|---|
| Example 1 | 0.039 | 1.38 | $2.4 \times 10^7$ | 130 | 129 | 124 | 5 |
| Example 2 | 0.046 | 1.66 | $1.2 \times 10^7$ | 123 | 122 | 116 | 6 |
| Example 3 | 0.043 | 1.55 | $9.2 \times 10^6$ | 126 | 125 | 120 | 5 |
| Example 4 | 0.042 | 1.55 | $8.3 \times 10^6$ | 102 | 101 | 95 | 6 |
| Example 5 | 0.044 | 1.62 | $8.6 \times 10^6$ | 157 | 156 | 151 | 5 |
| Comparative Example 1 | 0.48 | 17.3 | $2.5 \times 10^6$ | 126 | 126 | 113 | 13 |

As can be seen from Table 1, the PTC elements of the invention exhibit an extremely low resistivity at 20° C. and a high resistivity at a peak temperature, showing a very steep increase in resistance in a narrow temperature range.

As has been described above, the PTC elements of the present invention exhibit an extremely low resistivity at 20° C. and a high resistivity at a peak temperature, showing a steep rise in resistance in a narrow temperature range. Therefore, they have a broadened range of application and are suited for use even in high current circuits and for electrical devices in which a high current passes. The process for producing a PTC element according to the present invention makes it possible to produce such an excellent PTC element with ease.

While the invention has been described in detail and with reference to specific embodiments thereof, it will be apparent to one skilled in the art that various changes and modifications can be made therein without departing from the spirit and scope thereof.

What is claimed is:

1. A PTC element comprising a conductive sheet comprising a crystalline polyolefin containing a conductive filler in a polymer matrix, wherein an electrode of a metallic foil is provided on both sides of the conductive sheet, and wherein said PTC element has:

(i) a resistivity $\rho_{20}$ of not more than 1.8 Ω·cm at 20° C., (ii) a peak resistivity $\rho_p$ of not less than $2.0\times10^6$ Ω·cm, and (iii) a temperature difference $T_a$ in °C.–$T_b$ in °C. of not greater than 10° C., wherein $T_a$ in °C. is a temperature at which the resistivity is $10^6$ times the resistivity $\rho_{20}$ at 20° C. and $T_b$ in °C. is a temperature at which the resistivity is 10 times the resistivity $\rho_{20}$ at 20° C. and wherein said crystalline polyolefin has a melt flow rate of 0.01 to 15.

2. A PTC element according to claim 1, wherein said crystalline polyolefin is polyethylene.

3. A PTC element according to claim 1, wherein said conductive filler is particulate glassy carbon having an average particle size of 1 to 50 μm.

4. A PTC element according to claim 1, wherein said temperature difference $T_a$–$T_b$ in °C. is 1° to 8° C.

5. A process for producing a PTC element comprising the steps of:

(i) mixing a crystalline polyolefin and a conductive filler;

(ii) molding the mixture into a conductive sheet;

(iii) press bonding under heat a metallic foil to both sides of the conductive sheet; and (iv) repeatedly subjecting the conductive sheet to a heating and cooling cycle comprising heating at a temperature of not lower than the melting point of the crystalline polyolefin minus 5° C. and then cooling to a temperature lower than the melting point of the crystalline polyolefin minus 5° C.;

wherein said PTC element has:

(i) a resistivity $\rho_{20}$ of not more than 1.8 Ω·cm at 20° C., (ii) a peak resistivity $\rho_p$ of not less than $2.0\times10^6$ Ω·cm, and (iii) a temperature difference $T_a$ in °C.–$T_b$ in °C. of not greater than 10° C., wherein $T_a$ in °C. is a temperature at which the resistivity is $10^6$ times the resistivity $\rho_{20}$ at 20° C. and $T_b$ in °C. is a temperature at which the resistivity is 10 times the resistivity $\rho_{20}$ at 20° C. and wherein said crystalline polyolefin has a melt flow rate of 0.1 to 15.

6. A process for producing a PTC element according to claim 5, wherein said crystalline polyolefin is polyethylene.

7. A process for producing a PTC element according to claim 5, wherein said conductive filler is particulate glassy carbon having an average particle size of from 1 to 50 μm.

* * * * *